3,671,330

REMOVAL OF ACCEPTOR IMPURITIES FROM HIGH PURITY GERMANIUM

Robert N. Hall, Schenectady, N.Y., assignor to General Electric Company

No Drawing. Filed Oct. 21, 1970, Ser. No. 82,788
Int. Cl. C22b *41/00*
U.S. Cl. 148—1.6 8 Claims

ABSTRACT OF THE DISCLOSURE

Ultra-pure germanium is prepared free of acceptor impurities by melting zone refined, or comparable purity, germanium in a quartz crucible and growing single crystals from the melt by seed crystal withdrawal ingot growth. The process is repeated until the desired purity is obtained. Prior to re-use of previously used crucibles, crucibles are etched to remove acceptor-quartz reaction product from the surface thereof.

The present invention relates to the processing and preparation of hyper-pure germanium. More particularly, the invention relates to the preparation of germanium having a purity as is indicated by the presence thereof electrically significant impurities of the order of $10^{10}$ per cubic centimeter of germanium or less. The invention described herein was made in the course of or under a contract with the Atomic Energy Commission.

In the prior art, the processing of germanium to obtain the requisite purity thereof for electronic uses as for example, in the fabrication of transistors, rectifiers and other such semiconductor devices, has progressed to the point such that the attainment of a purity represented by the presence in the germanium of the order of $10^{12}$ uncompensated donor or acceptor impurities per cubic centimeter of germanium is more than adequate for such needs. The achievement of such purity has come to be routine and may be achieved by any of a number of well-established processes such as zone refining, seed crystal withdrawal and other methods of fractional crystallization.

Germanium is, however, used for other purposes than in the fabrication of the usual electronic semiconductor devices. One such use is in the fabrication of semiconductor detectors for high energy particles, as for example, gamma rays. In accord with prior art usage, the impurities contained in germanium that does not have the requisite inherent purity to function as detectors for such particles, are compensated using the so-called "lithium drift" technique as is set forth in Pell Pat. 3,016,313. In accord with such process, lithium, a highly mobile donor in semiconductors is caused to diffuse into the semiconductor under the influence of an electric field to neutralize acceptor impurities therein and compensate the same providing an effective high purity. Such lithium drift detectors are sensitive to high temperatures and must be carefully fabricated, stored and utilized in order to accommodate this characteristic since they deteriorate even under storage at room temperature.

Accordingly, it is an object of the present invention to provide hyper-pure germanium having a sufficiently low concentration of uncompensated acceptor impurities to facilitate the fabrication of particle detectors therefrom without the use of impurity additive techniques, thereby providing detectors which are stable under storage at room temperature.

Still another object of the present invention is to provide hyper-pure germanium having an inherent concentration of uncompensated electrically active activator impurities thereof of the order of $10^{10}$ impurity activators per cubic centimeter thereof or less.

Yet, another object of the present invention is to reduce the concentration of uncompensated aluminum in germanium so that the aluminum is present in concentration of less than $10^{10}$ atoms per cubic centimeter of germanium.

Briefly stated, in accord with the present invention, in one specific embodiment, I provide ultra-pure germanium from which acceptor activators, particularly aluminum, have been removed by a process which includes the repeated melting thereof in a high purity quartz crucible, the growth of a crystal by seed crystal withdrawal from the melt and the discarding of the approximate sprout half of the crystal before remelting. In further accord with the invention, crucibles utilized in the repeated growth cycles are rinsed in an etch prior to reuse, to remove therefrom any acceptor-quartz reaction product which may contaminate the subsequently-melted germanium.

The novel features believed characteristic of the present invention are set forth in the appended claims. The invention itself, together with further objects and advantages thereof may best be understood with reference to the following detailed description.

Since the mid 1950's, relatively high purity germanium has been readily available on a commercial basis. For example, samples have been prepared in this laboratory at that time having a net donor concentration of $1.1\times10^{12}$ per cubic centimeter thereof, which is 25 times less than the intrinsic concentration at room temperature. Since the requirement for such high purity has, heretofore, been substantially non-extentent, there has been little or no incentive to reduce the impurity concentration further. Even today, the best germanium that is commercially available is only about a factor of two times better in purity than that mentioned herein. More recently, germanium, having an apparent high purity has been prepared by repeated float-zoning in a hydrogen atmosphere. This germanium, however, appeared to have electrical properties which were dominated by "deep-level" impurities of unknown origin, making a clear evaluation of the impurity content difficult. Low temperature measurements of other germanium having the same order of impurities showed that the conductivity thereof was due to "shallow-level" acceptors which were indistinguishable from the usual donors and acceptors of columns III and V of the Periodic Table of the Elements. Studies of these crystals indicated that some source of uncontrolled contamination interfered with the purification, but that there was no theoretical reason why higher purity germanium could not be prepared. Recent work in this Laboratory has shown that utilizing the best available starting material and the best available equipment, to prevent contamination thereby, still resulted in an uncompensated acceptor concentration of the order of $10^{11}$ or $10^{12}$ uncompensated acceptors per cubic centimeter thereof.

In attempting to provide germanium of sufficient purity such as to permit the direct fabrication of high energy particle detectors without the utilization of activator impurity addition, as for example, by the lithium drift process, in order to achieve an apparent high purity, I have undertaken to eliminate all sources of impurity and to endeavor to remove all impurities present from the best commercially available germanium. Such germanium is generally prepared by fractional crystallization. As used herein, the term "fractional crystallization" is generic to several well-known processes for the preparation of high purity semiconductor materials wherein a substantial surface of the molten germanium is in contact with ambient atmosphere. Thus, this term is intended to include the Czochralski seed crystal withdrawal method for growth of crystalline ingots described, for example, in Horn Pat. 2,904,512, issued Sept. 15, 1959. Another such method is the zone-refining technique, described, for example, in Pfann Pat. 2,739,088, issued Mar. 20, 1956. A further technique is the special adaption of zone-refining known as float-zoning, is descirbed, for example, in Hambach Pat. 3,251,658, issued Mar. 17, 1966. Fractional crystallization does not, however, include the so-called Bridgeman technique of re-crystallization within a confined space and its associated and derivative processes.

In accord with the invention disclosed and claimed in my co-pending application, Ser. No. 772,044, filed Oct. 3, 1968, now Pat. No. 3,573,108, and assigned to the assignee of this invention, I perceived that one source of uncompensated acceptor impurities in P-type germanium having a purity of the order of $10^{12}$ uncompensated acceptors per cubic centimeter thereof, was a boron complex which was formed in the melt and comprised an unspecified aggregation of boron and oxygen atoms to provide a compound having an apparent segregation co-efficient of very nearly unity in germanium, which would make the complex difficult to remove by fractional crystallization, that was responsible for the unspecified and difficult to remove acceptor impurity in high purity P-type germanium. In accord with that invention, I was able to remove the unspecified acceptor impurity from some samples of germanium and to provide germanium having a concentration of uncompensated acceptor impurities of the order of $10^{10}$ per cubic centimeter thereof. As my work proceeded, however, it became apparent that although the process disclosed and claimed in the aforementioned application was effective with some samples, it did not appear to be universally effective and, in some samples of germanium received from various sources, there remained a persistent unacceptably high concentration of an uncompensated acceptor impurity present in the melt.

Normally in the preparation of germanium ingots by seed crystal withdrawal, the impurity which is present in the grown ingot is present in less quantity in the seed end of the ingot and in greater quantity of the sprout end of the ingot and has a non-linear distribution therebetween. This is due to the fact that most normal donor and acceptor impurities have a segregation co-efficient of germanium which is substantially less than unity and the larger portion of the impurity is rejected from the growing crystal, making the concentration of the impurity in the melt an ever-increasing value. The unidentified and persistent acceptor impurity which seemed to be a limiting factor in the preparation of high purity germanium displayed an unusual characteristic different from this normal characteristic. This characteristic has been denominated as a "non-segregating" acceptor. The "non-segregating" acceptor showed the unique characteristic of having essentially the same concentration throughout the crystal grown in accord with the seed crystal withdrawal method of fractional crystallization crystal growth.

Experience gained during work aimed at preparing high purity germanium, showed that an important source of heretofore unremovable acceptor impurities in the high purity germanium grown prior to the present invention was due to impurities absorbed from the crucible. In the processing of high purity germanium, exceeding care must be taken in order to provide crucibles which are non-reactive with the germanium at the melting point thereof, i.e., 937° C. Crucibles utilized in such processes are carefully prepared, utilizing processes which filter out or remove impurities likely to react with the molten germanium or to supply impurities thereto. Suitable materials which are generally used include synthetic quartz, silicon nitride, glassy carbon and pyrolytic graphite coated carbon crucibles. The crucibles so prepared are exceedingly expensive and it is general practice, and actually an economic necessity due to the cost thereof that crucibles be re-used for more than one growth cycle. Prior to the present invention, it was believed that a crucible utilized for a given material, i.e., germanium, would improve with use, insofar as its being a poor source of contaminant impurities, in that the impurities which may possibly be contained therein would be progressively removed with further melting cycles.

In accord with the present invention, I have come to the understanding that an important factor governing contamination from quartz crucibles involves a chemical reaction between the acceptor impurities and the surface of the quartz crucible. Thus, the following mechanism is believed to be responsible for contamination of prior art crystal growth.

Acceptor impurities, such as aluminum are highly reactive and may react with clean quartz to form an acceptor-quartz complex, the exact nature of which is not understood. When germanium containing trace amounts of aluminum (for example) is melted in a quartz crucible, a certain amount of the aluminum is accepted into the growing crystal in a quantity determined by the segregation co-efficient. The aluminum which is rejected at the growing crystal, rather than increasing in concentration as most impurities do, strikes a chemical equilibrium with the quartz crucible walls and forms a complex compound with the surface thereof, such as to maintain a constant concentration of aluminum in the melt, so that the amount of aluminum found in the growing ingot is substantially constant throughout. This "non-segregating" acceptor behavior has been confirmed by a theoretical analysis which takes into account this postulated reaction between the acceptor and the surface of the crucible.

When a crucible that has once been used is subsequently re-used in an effort to further purify a once-purified ingot, after the sprout end has been cut off, the germanium placed in the crucible, once molten, dissolves some of the aluminum-quartz compound at the surface of the crucible and becomes more contaminated in the molten state than when it was placed in the crucible. Thus, it becomes impossible, utilizing multiple seed crystal withdrawal growth cycles, to increase the purity of germanium beyond that of the first-grown ingot from a new clean quartz crucible.

The validity of the postulated mechanism is borne out, not only by the phenomenon of the "non-segregating" acceptor, but also by an observed fact that, although a first melting of germanium and growth of an ingot by seed crystal withdrawal therefrom in a new crucible yields a marked improvement of the impurity content therein, further growth of ingots from the same crucible or from another previously-used crucible does not improve the acceptor impurity characteristic of the germanium.

In accord with the present invention, I provide a multiplicity of seed crystal withdrawal steps and, prior to reusing any quartz crucible, I etch with an etchant suitable to remove the surface acceptor-quartz complex compound so as to duplicate the conditions of a new crucible.

Utilizing the intermediate etching step in accord with the present invention, I am able to grow crystals of germanium by multiple seed crystal withdrawal cycles wherein any number of cycles from two to six or more, and preferably only two or three is effective to provide germanium having a maximum concentration of uncompensated aluminum, or any acceptor impurity, no greater than $10^{10}$ atoms thereof per cubic centimeter throughout a major fraction of its length.

In accord with the present invention, I utilize a starting material of zone refined germanium in a quantity of approximately 400–1000 grams and for purposes of explanation, approximately 500 grams, obtainable for example, as LMC Intrinsic Grade germanium from Hoboken Division of NPC Metals and Chemicals Company of Los Angeles, Calif., or Eagle-Picher special zone-refined germanium. Such germanium, having a maximum impurity concentration of approximately $10^{12}$ atoms per cubic centimeter, in the form of zone refined bars approximately 6 square centimeters in area and 16 centimeters long are etched in white etch, (a mix of 3 parts concentrated nitric acid and 1 part hydrofluoric acid by volume) rinsed in highly purified distilled water and again with isopropyl alcohol, for example, and placed in a Spectrosil synthetic quartz crucible. Hydrogen is then flowed through the chamber enclosing the crucible at a rate of approximately 100 cubic centimeters per minute while the crucible is heated with an RF induction heater and a silicon susceptor to heat the germanium. After the germanium is melted, its temperature is adjusted to approximately 937° C., maintaining the hydrogen flow at a rate of approximately 100 cubic centimeters per minute. A seed crystal comprising a monocrystalline "needle" of germanium having the (1,0,0) plane parallel with the surface of the melt is inserted into the melt and allowed to come into equilibrium therewith. The seed crystal is then slowly withdrawn at a rate which may conveniently vary from 3 to 10 centimeters per hour but which preferably may be approximately 6 centimeters per hour and at a rotation rate of approximately 2 revolutions per second, for example, while maintaining the furnace power at a value such as to obtain the desired crystal diameter.

The crystal so drawn is approximately 12 centimeters long and 3 centimeters in diameter. The grown ingot is cooled, etched in white etch, and evaluated by measuring its electrical resistivity at liquid nitrogen temperature as a convenient means of determining the distribution of impurities therein. The ingot is then cut approximately in half, etched in white etch again, washed in distilled water and again in distilled methyl or isopropyl alcohol and dried. Preferably it is combined with a similarly cleaned top half section of another crystal of comparable purity to provide a charge of approximately 500 grams of purified germanium. Prior to re-use, the crucible is washed in a suitable etch which may be "white etch" or any other etch suitable to remove the surface contamination of the quartz crucible as for example, a 20% solution of HF in water, or a peroxide etch comprising one part HF, one part $H_2O_2$ and four parts $H_2O$ by volume or a KOH etch. The crucible is then washed in distilled water and again in isopropyl or distilled methyl alcohol and air dried. The seed ends of two or more crystalline ingots, cleaned as described above, and aggregating approximately 500 grams are placed in the crucible and the crucible is again heated as is described hereinbefore and, once again, a seed crystal is inserted therein, equilibriated, and withdrawn. The process is repeated any given number of times, as desired, until the desired degree of purity is obtained. The purity may be determined by passing a current through the crystal while cooled to liquid nitrogen temperature and measuring the resulting potential distribution along its length in order to determine its resistivity, or by cutting pieces from selected portions of the crystal and making Hall effect measurements thereupon. Depending upon the initial purity of the germanium with which the process is started, it may take from 2 to 6, but ideally not more than 2 to 3 seed crystal withdrawal cycles, with intermediate etching of the crucible, to produce a germanium ingot in which a major portion of the germanium near the seed end varies from $10^{10}$ impurity atoms per cubic centimeter to no higher than $10^{11}$ impurity atoms per cubic centimeter. Typically, a sample cut therefrom may exhibit a resistivity of approximately 9000 ohm centimeters at 77° K. with a test current of approximately 1 milliampere, corresponding to a net impurity concentration of $1.5\times10^{10}$ impurities per cubic centimeter.

Utilizing the process as described above, the "nonsegregating" acceptor impurity phenomenon has been removed as a limiting factor in the growth of high purity germanium crystals, and crystals of unprecedented purity have been obtained. Furthermore, the purity of these crystals is reproducible from samples of germanium from any available commercial source of "purified" germanium, and the purity thereof has been verified and duplicated numerous times so that there is no question but that the hypothesis as to the mechanism for the contamination postulated hereinbefore is operative.

While the invention has been disclosed herein with respect to certain specific examples and illustrative features, many modifications and changes will readily occur to those skilled in the art. Accordingly, I intend, by the appended claims, to cover all such modifications and changes as fall within the true spirit and scope of the foregoing disclosure.

What I claim as new and desire to secure by Letters of the United States is:

1. The method of preparing ultra-high purity germanium which comprises:

(a) repeatedly melting a quantity of nominally pure germanium containing trace amounts of residual electrically active acceptor impurities in a quartz crucible;

(b) growing from each melt a purified ingot by seed crystal withdrawal therefrom and discarding approximately the sprout half thereof before remelting; and (c) subjecting said crucible to a chemical etch prior to remelting said germanium therein to remove from the surface thereof any acceptor-quartz reaction product formed by a previous melting cycle.

2. The method of claim 1 wherein said chemical etch is performed utilizing an etchant of approximately 3 parts nitric acid and 1 part hydrofluoric acid.

3. The method of claim 1 wherein said chemical etch is performed utilizing an etchant of approximately 1 part hydrofluoric acid, 1 part hydrogen peroxide and 4 parts water.

4. The method of claim 1 wherein said seed crystal withdrawal crystal growth is performed sequentially approximately 2 to 5 times.

5. The method of claim 1 wherein the impurity acceptor removed by etching said crucible is aluminum.

6. The method of claim 1 wherein said chemical etch is performed utilizing an etchant of approximately 1 part hydrofluoric acid and 4 parts water by volume.

7. The method of claim 1 wherein said chemical etch is performed utilizing a potassium hydroxide etchant.

8. The method of claim 1 wherein the starting germanium material has a concentration of uncompensated acceptor impurities of approximately the order of $10^{12}$ per cubic centimeter thereof.

References Cited

UNITED STATES PATENTS

| | | | |
|---|---|---|---|
| 2,683,676 | 7/1954 | Little et al. | 148—1.5 |
| 2,904,512 | 9/1959 | Horn | 252—62.3 |
| 3,012,865 | 12/1961 | Pellin | 23—308 |
| 3,093,456 | 6/1963 | Runyan et al. | 23—301 SP |
| 3,173,765 | 3/1965 | Gobat et al. | 23—301 SP |
| 3,429,756 | 2/1969 | Groves | 148—1.6 X |
| 3,573,108 | 3/1971 | Hall | 148—1.6 |

L. DEWAYNE RUTLEDGE, Primary Examiner

G. T. OZAKI, Assistant Examiner

U.S. Cl. X.R.

148—1.5, 172, 176; 23—301 SP